US007809657B2

(12) United States Patent
Subbu et al.

(10) Patent No.: US 7,809,657 B2
(45) Date of Patent: Oct. 5, 2010

(54) SYSTEM AND METHOD FOR IMPLEMENTING A MULTI OBJECTIVE EVOLUTIONARY ALGORITHM ON A PROGRAMMABLE LOGIC HARDWARE DEVICE

(75) Inventors: Rajesh Venkat Subbu, Clifton Park, NY (US); Stefano Romoli Bonissone, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 216 days.

(21) Appl. No.: 11/485,101

(22) Filed: Jul. 12, 2006

(65) Prior Publication Data

US 2008/0016013 A1 Jan. 17, 2008

(51) Int. Cl.
*G06N 5/00* (2006.01)
(52) U.S. Cl. .............................. 706/13; 706/20; 706/45
(58) Field of Classification Search .................. 706/13, 706/14, 22, 45, 20; 709/28
See application file for complete search history.

(56) References Cited

U.S. PATENT DOCUMENTS

| 7,222,323 | B2* | 5/2007 | Martin | 716/16 |
|---|---|---|---|---|
| 7,395,235 | B2* | 7/2008 | Dhurandhar et al. | 705/26 |
| 7,398,257 | B2* | 7/2008 | Kaji | 706/19 |
| 2004/0030664 | A1* | 2/2004 | Kotoulas et al. | 706/22 |
| 2004/0044633 | A1 | 3/2004 | Chen | |
| 2005/0038761 | A1* | 2/2005 | Martin | 706/13 |
| 2005/0209982 | A1 | 9/2005 | Jin et al. | |
| 2006/0085558 | A1* | 4/2006 | Solomon | 709/238 |

OTHER PUBLICATIONS

Barry Shackleford et al., A High-Performance, Pipelined, FPGA-Based Genetic Algorithm Machine, 2001, Kluwer Academic Publishers, 33-60.*
A. Gaspar-Cunha et al., A Multi-Objective Evolutionary Algorithm Using Neural Networks to Approximate Fitness Evaluations, 2005, International Journal of Computers, Systems and Signals, vol. 6, No. 1, 18-36.*
John R. Koza et al., Evolving Sorting Networks using Genetic Programming and the Rapidly Reconfigurable Xilinx 6216 Field-Programmable Gate Array, 1998, IEEE, 1058-6393/98.*
Xiangwei Zheng et al., A Hybrid Multi-objective Evolutionary Algorithm and Its Application in Component-based Product Design, 2007, IEEE, 0-7695-2909-7/07, 570-575.*

(Continued)

*Primary Examiner*—Wilbert L Starks, Jr.
(74) *Attorney, Agent, or Firm*—Ann M. Agosti

(57) ABSTRACT

A system for implementing a multi objective evolutionary algorithm (MOEA) on a programmable hardware device is provided. The system comprises a random number generator, a population generator, a crossover/mutation module, a fitness evaluator, a dominance filter and an archive. The random number generator is configured to generate a sequence of pseudo random numbers. The population generator is configured to generate a population of solutions based on the output from the random number generator. The crossover/mutation module is configured to adapt the population of solutions to generate an adapted population of solutions. The fitness evaluator is configured to evaluate each member comprising the population of solutions and the adapted population of solutions. The fitness evaluator is implemented on the programmable hardware device. The dominance filter is configured to select a subset of members from the population of solutions and the adapted population of solutions and generate a filtered population of solutions. The archive configured to store populations of solutions.

7 Claims, 3 Drawing Sheets

OTHER PUBLICATIONS

Rajeev Kumar et al., Object Oriented Toolkit for Multiobjective Genetic Optimisation, 1999, IEEE.*

John A. Biles et al., Neural Network Fitness Functions for a Musical IGA, 1996, ICSC.*

Bonomali Khuntia et al., Genetic Algorithm with Artificial Neural Networks as Its Fitness Function to Design Rectangular Microstrip Antenna on Thick substrate, 2005, Microwave and Optical Technology Letters, vol. 44, No. 2.*

Shackleford, et al, A High-Performance, Piplined, FPGA-Based Genetic Algorithm Machine, Genetic Programming and Evolvable Machines, 2, 2001, pp. 33-60.*

Gaspar-Cunha, et al, A Hybrid Multi-Objective Evolutionary Algorithm Using an Inverse Neural Network, pp. 25-30.*

Burton et al, Generation of Musical Sequences with Genetic Techniques, Computer Music Journal, 23:4, Winter 1999, The Massachusetts Institute of Technology, pp. 59-73.*

Eberhart et al, The Role of Genetic Algorithms in Neural Network Query-Based Learning and Explanation Facilities, Combinations of Genetic Algorithms and Neural Networks, 1992., COGANN-92. International Workshop on, 1992, pp. 169-183.*

Biles et al, Neural Network Fitness Functions for a Musical IGA, Proceedings of the International Symposium on Intelligent Industrial Automation and Soft Computing, 1996, pp. 39-44.*

Zheng, Xiangwei et al., "A Hybrid Multi-objective Evolutionary . . . ", IEEE (2007).

Kumar, Rajeev et al., "Object Oriented Toolkit for Multiobjective . . . ", IEEE (Jan. 1, 1999).

Shackleford, Barry et al., "A High-Performance, Pipelined . . . ", Kluwer (Mar. 2001).

Biles, John A. et al., "Neural Network Fitness Functions . . . ", ICSC (Mar. 26, 1996).

Khuntia, Bonomali et al., "Genetic algorithm with . . . ", Wiley Interscience (Dec. 4, 2004).

A. Gaspar-Cunha and A. Vieira, "A Multi-Objective Evolutionary Algorithm Using Neural Networks to Approximate Fitness Evaluations", International Journal of Computers, Systems and Signals, vol. 6, No. 1, 2005 pp. 18-36.

A.R. Burton and T. Vladimirova, "Genetic Algorithm Utilising Neural Network Fitness Evaluation for Musical Composition", In Proceedings of the 1997 International Conference on Artificial Neural Networks and Genetic Algorithms, pp. 220-224.

* cited by examiner

SYSTEM AND METHOD FOR IMPLEMENTING A MULTI OBJECTIVE EVOLUTIONARY ALGORITHM ON A PROGRAMMABLE LOGIC HARDWARE DEVICE

BACKGROUND

The invention relates generally to multi objective evolutionary computation, and more particularly to a system and method for implementing a multi objective evolutionary algorithm on a programmable logic hardware device.

Evolutionary algorithms refer to stochastic search techniques that are modeled after the process of natural biological evolution. Evolutionary algorithms operate on a population of potential solutions to a problem by applying the principle of the survival of the fittest to produce better solutions. At each generation, a new set of solutions is created by the process of selecting individuals according to their level of fitness or performance in the problem-solving task and breeding them together using genetic operators. This process leads to the evolution of populations of individuals that are better suited to their problem-solving task environment than the individuals that they were created from, just as in natural evolution.

Evolutionary algorithms have been traditionally deployed on general-purpose computational systems. Parallel and distributed computing techniques have been employed on general-purpose computational systems to improve the computational efficiency of an evolutionary algorithm. Since evolutionary algorithms generally work with a population of solutions, significant computational speed-ups may be achieved by parallelizing the fitness computation. In addition, distributed evolutionary computing techniques have been employed when the problem-solving may be speeded up by problem decomposition. However, for the efficient execution of applications requiring high-frequency multi-objective optimization constrained by the size of the computational unit, it would be desirable to develop a multi-objective evolutionary technique that enables high optimization speed-ups with a small computational footprint.

BRIEF DESCRIPTION

Embodiments of the present invention address this and other needs. In one embodiment, a system for implementing a multi objective evolutionary algorithm (MOEA) on a programmable hardware device is provided. The system comprises a random number generator, a population generator, a crossover/mutation module, a fitness evaluator, a dominance filter and an archive. The random number generator is configured to generate a sequence of pseudo random numbers. The population generator is configured to generate a population of solutions based on the output from the random number generator. The crossover/mutation module is configured to adapt the population of solutions to generate an adapted population of solutions. The fitness evaluator is configured to evaluate each member comprising the population of solutions and the adapted population of solutions. The fitness evaluator is implemented on the programmable hardware device. The dominance filter is configured to select a subset of members from the population of solutions and the adapted population of solutions and generate a filtered population of solutions. The archive configured to store populations of solutions.

In another embodiment, a method for implementing a multi objective evolutionary algorithm (MOEA) on a programmable hardware device is provided. The method includes generating a sequence of pseudo random numbers and generating a population of solutions based on the sequence of pseudo random numbers. The method further includes adapting the population of solutions to generate an adapted population of solutions and evaluating each member of the population of solutions and the adapted population of solutions. The evaluation is performed using a fitness evaluator implemented on the programmable hardware device. The method then includes selecting a subset of members from the population of solutions and the adapted population of solutions to generate a filtered population of solutions. The steps of evaluating and selecting are iteratively performed until one or more termination criteria are reached. The method finally includes storing the populations of solutions and the adapted population of solutions.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
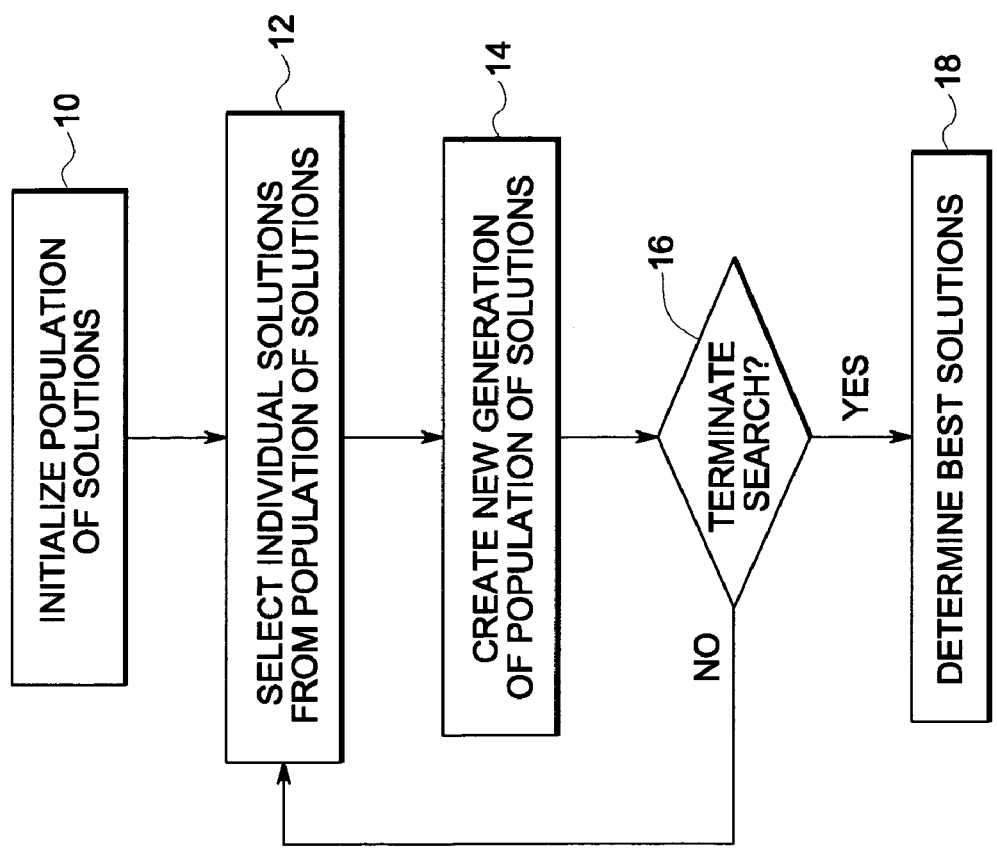
FIG. 1 is a flowchart illustrating the steps performed by a typical evolutionary algorithm.

FIG. 1 is a flowchart illustrating the steps performed by a typical evolutionary algorithm, such as for example, a genetic algorithm. As will be appreciated by those skilled in the art, a genetic algorithm refers to a class of evolutionary algorithms and an evolutionary algorithm refers to a broader class of stochastic search algorithms that utilize genetic operators. Evolutionary algorithms in general may include classes of genetic algorithms, evolutionary strategies, evolutionary programming, genetic programming, and their hybrid variants.

Referring to FIG. 1 now, in step 10, a population of solutions encoded according to a problem-dependent representation is initialized. The population of solutions is generally referred to as the "chromosome population" and each solution is encoded as a chromosome in the population. As used herein, a "chromosome" refers to any binary, integer or real-valued string representing a particular feature of a solution set. A variety of chromosomal encoding techniques are known in the art and may be employed to generate the initial population of solutions. The chromosome population may be generated through random variation covering an entire range of possible solutions. The size of the generated population generally depends on the nature of the problem and the size of the solution space, and may contain several hundreds of possible solutions.

In step 12, individual solutions from the population of solutions are selected to create a new generation. The individual solutions may be selected through a fitness-based process (generally measured by a fitness function) where fitter solutions are more likely to be selected.

In step 14, a new generation of population of solutions is created. The new generation may be created using genetic operators such as crossover and mutation. In other words, a chromosome is evolved using re-combination operators such as crossover and mutation, and new individuals are created from these operators to form the next generation of solutions. The new generation may share many of the characteristics of its "parent population". This process continues until a new generation of population of solutions of an appropriate size is generated. This process ultimately results in the creation of a next generation of population of solutions or chromosomes that is different from and better than the initial generation. Generally the average fitness increases by this procedure for the new population, since only the better members from a generation are selected for breeding, alongwith a small proportion of less fit solutions.

In step 16, a decision block is executed to determine if problem-dependent solution characteristics such as convergence have been achieved. If such characteristics have been achieved or allowable computational cycles have been exhausted, then at step 18, the best candidate solutions from the population of solutions is determined and the process flow ends. If the process does not terminate, the process continues as shown by the arrow to block 12. The termination criteria may include arriving at a solution that satisfies minimum criteria, reaching a fixed number of generations, or determining that the highest ranking solution's fitness has reached a level such that successive iterations no longer produce better results.

Figure 2:
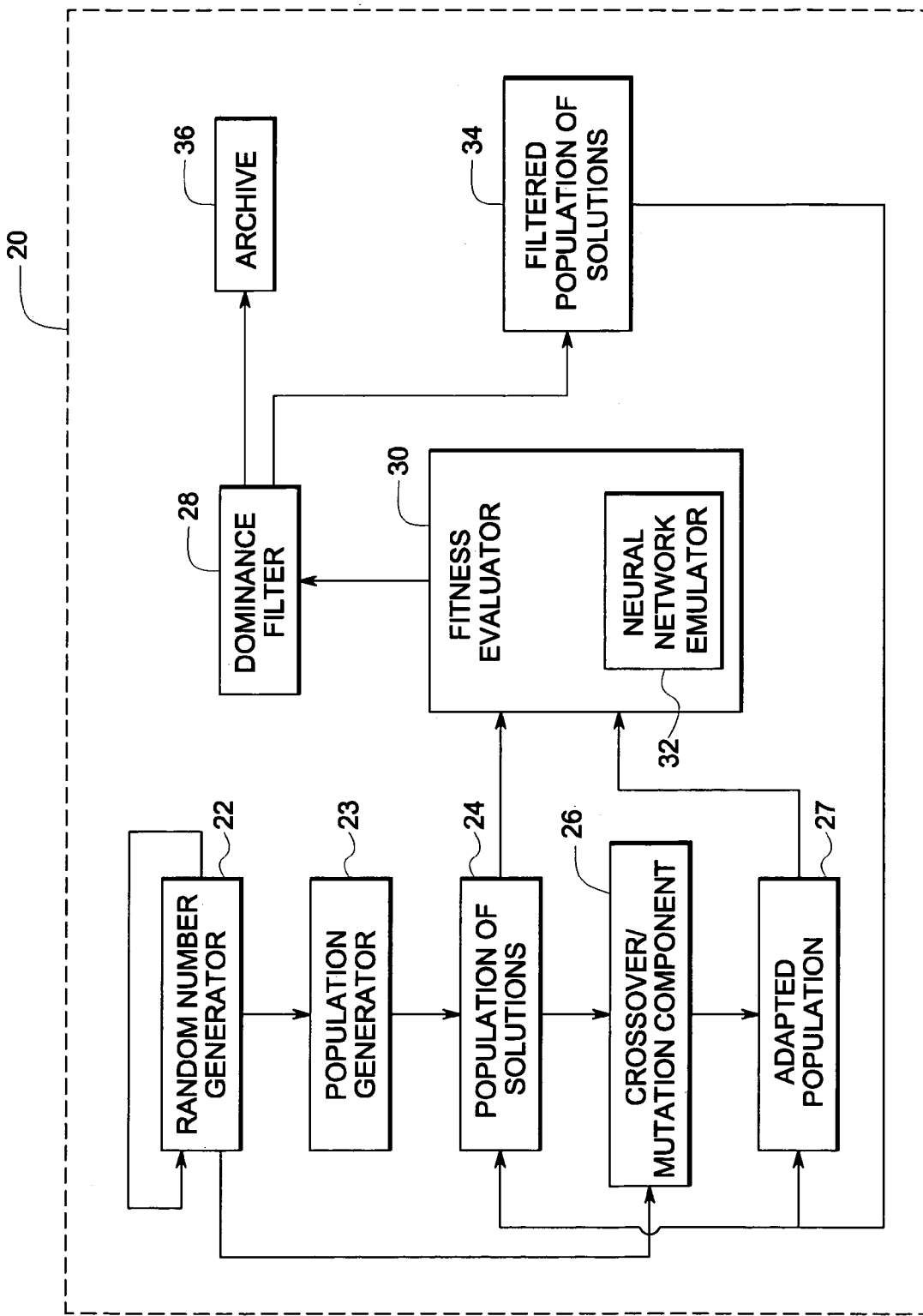
FIG. 2 is an illustration of a high-level system for implementing a multi objective evolutionary algorithm (MOEA) on a programmable hardware device in accordance with one embodiment of the present invention.

FIG. 2 is an illustration of a high level system for implementing a multi objective evolutionary algorithm (MOEA) on a programmable hardware device in accordance with one embodiment of the present invention. As will be appreciated by those skilled in the art, a MOEA simultaneously optimizes over more than one objective of interest, where the objectives may be mutually conflicting. In a MOEA, a solution is considered fitter than another if it dominates the other solution when all objectives are simultaneously considered.

Referring to FIG. 2, the system 20 generally includes a random number generator 22, a population generator 23, a crossover/mutation component 26, a dominance filter 28, a fitness evaluator 30 and an archive 36. The random number generator 22 is configured to generate a sequence of pseudo random numbers to create stochastically diverse solutions. In one embodiment, the random number generator 22 generates the sequence of pseudo random numbers using at least one of a Linear Feedback Shift Register (LFSR) technique or a Cellular Automata technique. As will be appreciated by those skilled in the art, the LFSR technique is based on using a bit shift register whose input bit is a linear function of its previous state. The Cellular Automata technique is based on a regular grid of cells, wherein each cell has a state and a set of neighboring cells, and each cell has the same time-triggered update rule based on its state and the states of its neighbors.

The population generator 23 is configured to generate a population of solutions 24 based on the output from the random number generator 22. As mentioned above, the population of solutions is generally referred to as the "chromosome population" and is typically generated randomly covering an entire range of possible solutions.

The crossover/mutation component 26 is configured to adapt one or more members comprising the population of solutions 24 to generate an adapted population of solutions 27. In one embodiment, the random number generator 22 is coupled to the crossover/mutation component 26 and is configured to stochastically adapt the population of solutions 24 to generate the adapted population of solutions 27 using genetic operators such as mutation and crossover. As used herein, the genetic operators "mutation" and "crossover" refer to probabilistic and deterministic operators that introduce needed solution features in populations to capture the best features of two parents to pass onto a new offspring. While mutation is typically achieved by perturbing a single solution to produce a new solution, crossover typically requires at least two solutions to produce one or more offspring solutions.

The dominance filter 28 is configured to select a subset of members from the population of solutions 24 and the adapted population of solutions 27 to generate a filtered population of solutions 34 based on the selection. As used herein, the "filtered population of solutions" 34 refers to a subset of members from the population of solutions 24 and the adapted population of solutions 27 that contribute to the next generation of members in the new population. In one embodiment, the filtered population of solutions 34 comprises individual solutions that represent best compromises between a set of fitness criteria as defined by a fitness function. The solution space operated on by the dominance filter 28 may therefore be represented by a set of dominated and non-dominated solution points. As used herein, a "non-dominated solution point" is a solution that is at least as good as another solution with respect to all objectives but strictly better with respect to at least one objective. In other words, one solution dominates another when it is as good in every objective and formally better in at least one objective.

In one embodiment, the dominance filter 28 determines the quality of solutions based upon the results of a fitness evaluator 30. The fitness evaluator 30 is configured to evaluate each member comprising the population of solutions 24 and the adapted population of solutions 27 according to a "fitness criteria". In a particular embodiment, the fitness evaluator 30 comprises a neural network emulator 32 to compute the "fitness function" for each member comprising the population of solutions 24 and the adapted population of solutions 27. The fitness function may include one or more analytical algorithms that evaluate each member against the set of "fitness criteria". The fitness criteria is generally application specific. For example, in an application for missile or unmanned vehicle control, the fitness criteria may include thrust and range, where thrust and range are mutually conflicting criteria given a finite fuel resource on-board the vehicle.

The fitness function computed by the fitness evaluator 30 may be used to determine whether or not a particular member comprising the population of solutions 24 and the adapted population of solutions 27 will contribute to the next generation of candidate solutions. In other words, the fitness evaluator 30 provides an evaluation of the population of solutions 24 and the adapted population of solutions 27 to the dominance filter 28 so that the dominance filter 28 can determine the selection of a member into the filtered population of solutions 34 based on the fitness function.

The population of solutions 24 and the adapted population of solutions 27 may be subsequently updated with the filtered population of solutions 34 and iteratively evaluated until a termination criterion is reached or a set of best candidate solutions is found. In a particular embodiment, the archive 36 is configured to store the population of solutions 24 and the adapted population of solutions 27 from each generation.

In one embodiment, the neural network emulator 32 may be represented by a set of inputs and a set of outputs. The inputs to the neural network emulator 32 (received by one or more input nodes) represent the values of a chromosome for a single member (each complete set of inputs corresponds to a single member of the population), while the outputs from the neural network emulator 32 (computed by one or more output nodes) represent the fitness values associated with the chromosome, of that particular member of the population. In a particular embodiment, the inputs represent members from the population of solutions 24 and the adapted population of solutions 27 and the outputs represent fitness values generated for each member comprising the population of solutions 24 and the adapted population of solutions 27.

As will be appreciated by those skilled in the art, the operation of evaluating the fitness function for a member of a population typically requires performing a significant number of computations. In accordance with a particular embodiment, the neural network emulator 32 is deployed on a programmable hardware device and is represented as a series of non-linear matrix multiplication computations on the programmable hardware device. In one embodiment, the programmable hardware device is a Field Programmable Gate Array (FPGA). As will be appreciated by those skilled in the art, an FPGA is a semiconductor device containing reprogrammable logic components and reprogrammable interconnects with which an instance of a high-level algorithm may be deployed as a sequential set of fast logic and switching functions.

In one embodiment, the neural network emulator 32 is initially trained offline using a training dataset and then loaded onto the programmable hardware device. The training data set may include a set of inputs provided to the input nodes and a respective set of desired outputs provided to the output nodes. In a particular embodiment, the neural network emulator 32 is trained offline for fitness prediction when presented with a population of solutions 24 and an adapted population of solutions 27. Once the training process is complete, the neural network emulator 32 is loaded onto the programmable hardware device to perform fitness function computations for one or more members comprising the population of solutions 24 and the adapted population of solutions 27. The neural network emulator 32 may be retrained on a periodic basis and on an as needed basis and then reloaded on the programmable hardware device.

Figure 3:
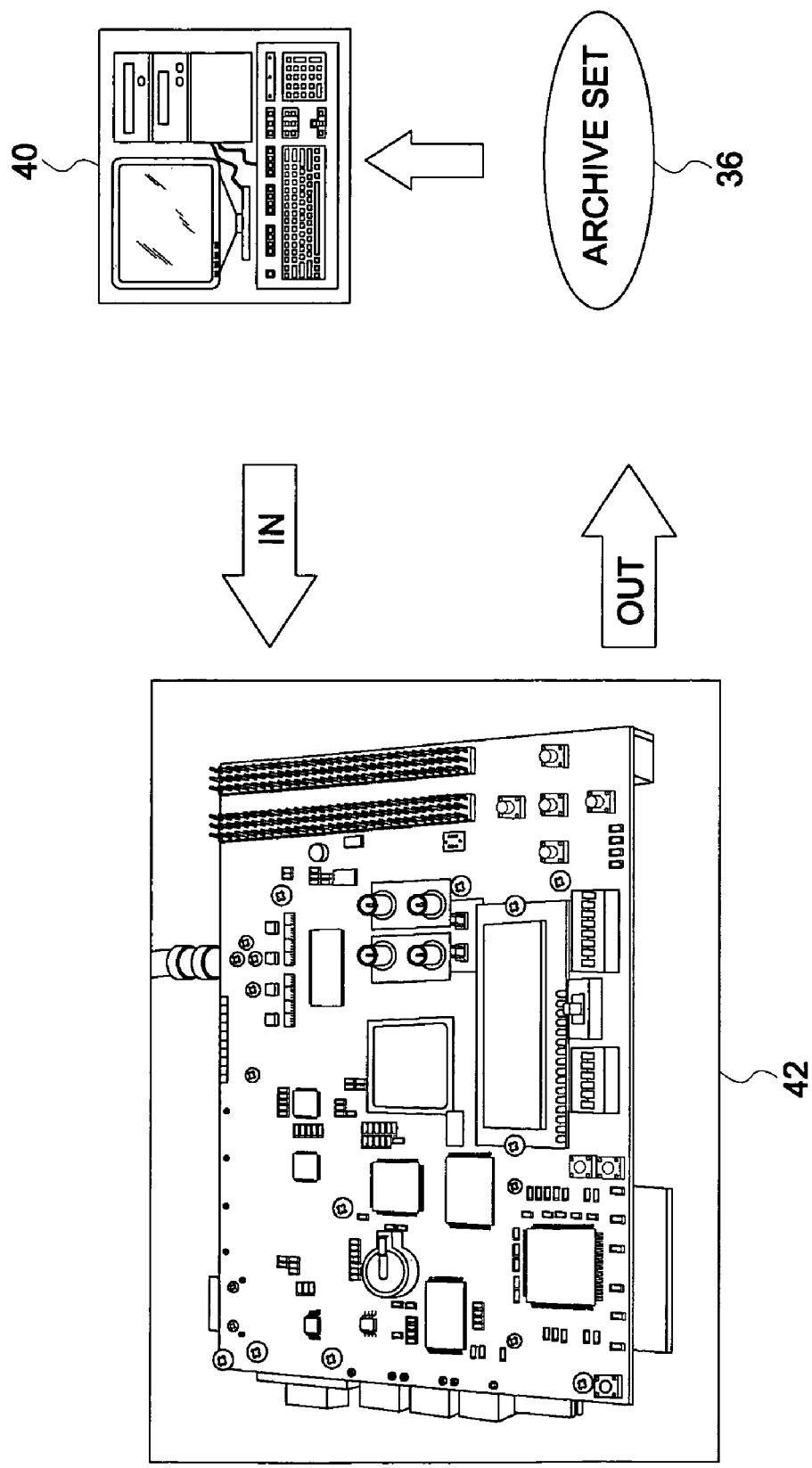
FIG. 3 is an exemplary illustration of a system using a multi objective evolutionary algorithm on a programmable hardware device in accordance with one embodiment of the present invention.

In accordance with one embodiment, the trained neural network emulator 32 is represented as a series of matrix multiplications on the programmable hardware device by creating a set of equations that represent the output of each output node as a function of the input values, which are provided to the input nodes. This set of functions of the various input variables can then be directly calculated based on the input values (i.e. the chromosome) of a given member of the population. As will be appreciated by those skilled in the art, the matrix multiplications implemented onto the programmable hardware device enable the evaluation of each chromosome or member in the population to take place at a very high speed, since the necessary matrix multiplications are implemented in hardware, rather than in software FIG. 3 is an exemplary illustration of a system using a multi objective evolutionary algorithm on a programmable hardware device in accordance with one embodiment of the present invention. As shown in FIG. 3, a master computational device 40 includes a programmable hardware device 42. The master computational device 40 launches the multi objective evolutionary algorithm and the fitness evaluator 30 on the programmable hardware device 42, which outputs the archive set of solutions 36 and returns those solutions to the master computational device 40. The master computational device 40 may then apply a decision-making technique to down-select one solution from the archive set of solutions 36 and deploy it on an application-specific control system to achieve an application-specific and problem-dependent goal. For example, in a missile or unmanned vehicle control application that requires high optimization speeds, with intense computational hardware footprint and weight constraints, and simultaneous consideration and optimization of multiple conflicting objectives (such as thrust and range, given varying mission needs while operating with a finite fuel resource), a control solution that achieves the best compromise in thrust and range at a given time may be deployed to the vehicle's attitude and thrust actuator control systems. The master computational device 40 may further be used for training and loading of the fitness evaluator 30 and evolutionary algorithm onto the programmable hardware device 42.

The operation of the system described in FIG. 3 is further discussed below. In one embodiment, the operation includes generating a sequence of pseudo random numbers and generating a population of solutions 24 based on the sequence of pseudo random numbers. The population of solutions 24 is then adapted to generate an adapted population of solutions 27.

Each member of the population of solutions 24 and the adapted population of solutions 27 is then evaluated using a fitness evaluator 30 implemented on the programmable hardware device 42. In a particular embodiment, the programmable hardware device is an FPGA. As described above, the fitness evaluator 30 includes a neural network emulator 32. The neural network emulator 32 computes a fitness function for each member comprising the population of solutions 24 and the adapted population of solutions 27. In one embodiment, the neural network emulator 32 is represented as a series of non-linear matrix multiplication computations on the programmable hardware device 42. In an alternate embodiment, the neural network emulator 32 may further be trained for fitness prediction and loaded onto the programmable hardware device 42 to perform fitness function computations for one or more members comprising the population of solutions 24 and the adapted population of solutions 27. A subset of members from the population of solutions 24 and the adapted population of solutions 27 may then be selected to generate a filtered population of solutions 34. The filtered population of solutions comprises a subset of members from the population of solutions and the adapted population of solutions.

The steps of evaluating and selecting are iteratively performed until one or more termination criteria are reached. At each step, the population of solutions 24 and the adapted population of solutions 27 are replaced with the filtered population of solutions 34 if at least one termination criterion is not met. In one embodiment, the selection of the member into the filtered population of solution sets 34 is determined based on the fitness function. The population of solutions 24 and the adapted population of solutions 27 may further be archived. The population of solutions 24 and the adapted population of solutions 27 may further be transmitted to the master computational device 40 that is configured to apply the decision-making technique over the population of solutions 24 and the adapted population of solutions 27 to select a solution for deployment. In another embodiment, the solutions archive 36 may be transmitted to a master computational device 40 configured to apply a decision-making function over the solutions archive 36 to select a solution for deployment.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system for controlling an unmanned vehicle using a multi-objective evolutionary algorithm, the system comprising:
a random number generator residing on a programmable hardware device for generating a sequence of pseudo random numbers;
a population generator residing on the programmable hardware device for generating a population of solutions based on the output from the random number generator;
a crossover/mutation module residing on the programmable hardware device for adapting one or more members of the population of solutions to generate an adapted population of solutions;
a fitness evaluator residing on the programmable hardware device for evaluating each member of the population of solutions and the adapted population of solutions, the fitness evaluator comprising a neural network emulator having inputs representing each member of the population of solutions and the adapted population of solutions and outputs representing at least two fitness functions for each member of the population of solutions and the adapted population of solutions, the at least two fitness functions including thrust and range;
a dominance filter residing on the programmable hardware device for selecting a subset of members from the population of solutions and the adapted population of solutions, the dominance filter generating a filtered population of solutions based on the at least two fitness functions generated by the fitness evaluator for each member of the population of solutions and the adapted population of solutions; and
an archive for storing an archive set of solutions from each generation on a master computational device,
wherein the master computational device applies a decision-making technique to select a solution from the archive set of solutions for use in unmanned vehicle control.

2. The system of claim 1, wherein the programmable hardware device comprises a Field Programmable Gate Array (FPGA).

3. The system of claim 1, wherein the pseudo random numbers are obtained using at least one of a Linear Feedback Shift Register technique and a Cellular Automata technique.

4. The system of claim 1, wherein the neural network emulator is initially trained offline using a training dataset and then loaded onto the programmable hardware device.

5. A method for controlling an unmanned vehicle using a multi-objective evolutionary algorithm, the method comprising:
generating a sequence of pseudo random numbers using a random number generator residing on a programmable hardware device;
generating a population of solutions based on the output from the random number generator using a population generator residing on the programmable hardware device;
adapting one or more members of the population of solutions to generate an adapted population of solutions using a crossover/mutation module residing on the programmable hardware device;
evaluating each member of the population of solutions and the adapted population of solutions using a fitness evaluator residing on the programmable hardware device, the fitness evaluator comprising a neural network emulator having inputs representing each member of the population of solutions and the adapted population of solutions and outputs representing at least two fitness functions for each member of the population of solutions and the adapted population of solutions, the at least two fitness functions including thrust and range;
selecting a subset of members from the population of solutions and the adapted population of solutions using a dominance filter residing on the programmable hardware device, the dominance filter generating a filtered population of solutions based on the at least two fitness functions generated by the fitness evaluator for each member of the population of solutions and the adapted population of solutions; and
storing an archive set of solutions from each generation on a master computational device,
whereby the master computational device applies a decision-making technique to select a solution from the archive set of solutions for use in unmanned vehicle control.

6. The method of claim 5, wherein the programmable hardware device comprises a Field Programmable Gate Array (FPGA).

7. The method of claim 5, further comprising replacing the population of solutions and the adapted population of solutions with the filtered population of solutions if at least one termination criterion is not met.

* * * * *